United States Patent [19]

Upmeier

[11] Patent Number: 4,696,575
[45] Date of Patent: Sep. 29, 1987

[54] SINGLE-SCREW EXTRUDER FOR PRODUCING THERMOPLASTIC AND ELASTOMERIC PRODUCTS

[75] Inventor: Hartmut Upmeier, Lengerich, Fed. Rep. of Germany

[73] Assignee: Windmöller & Hölscher, Lengerich, Fed. Rep. of Germany

[21] Appl. No.: 789,145

[22] Filed: Oct. 18, 1985

[30] Foreign Application Priority Data

Oct. 22, 1984 [DE] Fed. Rep. of Germany ....... 3438649

[51] Int. Cl.$^4$ ............................................... B29B 7/12
[52] U.S. Cl. ...................... 366/80; 425/190; 425/197; 425/208
[58] Field of Search ............. 366/79, 80, 90, 324; 264/349; 425/182, 190, 197, 199, 200, 204, 207, 208; 264/211.21, 211.23

[56] References Cited

U.S. PATENT DOCUMENTS

| 2,813,302 | 11/1957 | Beck | 425/204 |
| 3,804,381 | 4/1974 | Bielfeldt et al. | 425/208 |
| 3,997,147 | 12/1976 | Scherping | 425/208 |
| 4,178,104 | 12/1979 | Menges et al. | 366/80 |
| 4,408,887 | 10/1983 | Yamaoka | 366/80 |
| 4,541,982 | 9/1985 | Upmeier | 425/199 |

FOREIGN PATENT DOCUMENTS

| 1959348 | 6/1971 | Fed. Rep. of Germany | 425/208 |
| 1133446 | 3/1957 | France | 425/208 |

Primary Examiner—Jay H. Woo
Assistant Examiner—J. Fortenberry
Attorney, Agent, or Firm—Fleit, Jacobson, Cohn & Price

[57] ABSTRACT

A single-screw extruder for producing thermoplastic and elastomeric products includes a hollow cylindrical barrel, which is provided with radially inwardly protruding mixing elements, which are adapted to move through recesses formed in one or more helical lands of a screw, which is rotatably mounted in the barrel. To facilitate the assembly of the screw extruder and to permit repair thereof without a need to replace the entire housing, the mixing elements (9) are provided on split rings (9), which are held axially spaced apart by interposed spacing rings, or which are clamped in position in grooves formed in adjacent annular sections of the barrel.

11 Claims, 4 Drawing Figures

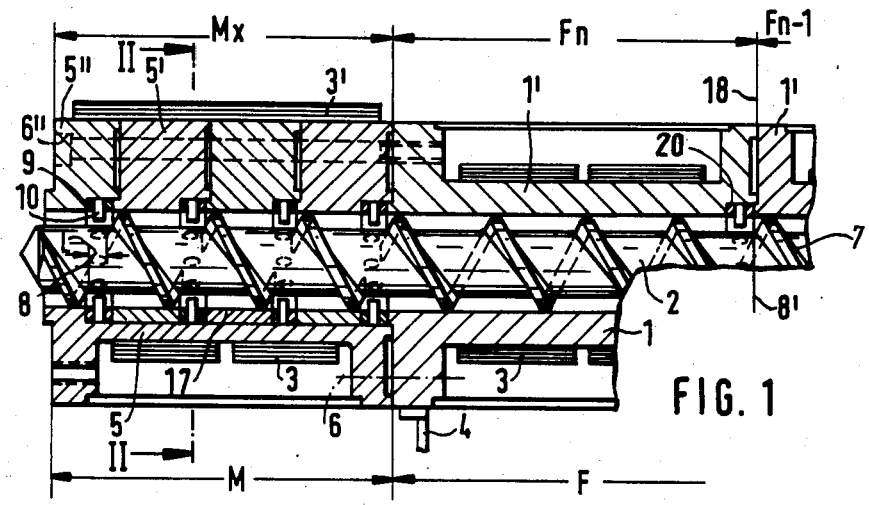

SINGLE-SCREW EXTRUDER FOR PRODUCING THERMOPLASTIC AND ELASTOMERIC PRODUCTS

BACKGROUND OF THE INVENTION

1. Field of the Invention

The invention relates to a single-screw extruder for producing thermoplastic and elastomeric products, comprising a hollow cylindrical barrel, which is provided with inwardly protruding mixing elements, and a screw, which is disposed in the barrel and has one or more helical lands formed with recesses, through which the mixing elements are adapted to move as the screw is rotating.

2. Description of the Prior Art

From German Patent Publication Nos. 12 45 584 and 22 35 784, Published German Application Nos. 26 34 024 and 30 03 615, and the periodical "Kunststoffberater", 3/1984, page 25, for instance, it is known to provide pins, which extend through the barrel wall into the helical channel of the screw and move through the helical land or lands of the screw in recesses formed in said land or lands. Said pins ensure thorough mixing because they prevent rotation of the molten plastic material in unison with the screw.

In the known single-screw extruders, the mixing pins extend radially and are screwed into the integral barrel. That arrangement involves difficulties in assembly and has the disadvantage that wear, which usually occurs only at a few points, will render the entire housing unusable so that it must be replaced.

SUMMARY OF THE INVENTION

It is an object of the invention to provide a single-screw extruder which is of the kind described hereinbefore which ensures thorough mixing and can easily be assembled, and in case of damage to the barrel can be repaired in a simple manner without the need for replacement of the entire barrel.

In accordance with a first aspect of the invention that object is accomplished in that the mixing elements are carried by split carrying rings, which are axially spaced apart by interposed spacing rings. The split carrying rings are inserted into the recesses of the helical land or lands and are axially fixed by the spacing rings, the inside surfaces of which constitute the inside surface of the barrel for the screw, so that in case of damage it will be sufficient to replace the spacing ring which has been damaged.

German Patent Publication No. 11 98 051 discloses a screw extruder which in its forward portion comprises a homogenizing zone. That zone is defined by interdigitating inner and outer rings, which have axial apertures and have been fitted in alternation on a pin, which constitutes an extension of the core of the screw. The inner ones of said rings are non-rotatably connected to the pin. The outer ones of said rings are non-rotatably connected to the cylindrical barrel. But the provision of interdigitating inner and outer rings arranged in alternation involves a complicated assembly operation, and in particular does not permit the screw to be made in one piece.

A rotation of the carrying rings and spacing rings with the screw will be prevented if said carrying rings and spacing rings are non-rotatably connected to the housing by suitable means.

From a second aspect of the invention, the object set forth is accomplished in that the barrel consists of annular or tubular barrel sections, which have inner edge portions, which when said sections are forced against each other constitute the side faces of grooves, and the mixing elements comprise mixing rings, which are clamped in said grooves. In case of damage it will be sufficient to replace that section of the barrel which has been damaged.

The mixing rings may carry radially inwardly protruding, cylindrical pins, which are known per se. In accordance with an additional feature of the invention, for which independent protection is claimed, the carrying or mixing rings are formed with passages which are inclined in mutually opposite senses in alternation and have inlets and outlets respectively disposed adjacent to the inside surface of the barrel and adjacent to the core of the screw. Such rings are known per se from German Patent Publication No. 20 23 910 and Published German Application No. 33 17 347, but the known rings are arranged to rotate in unison with the core. The mixing rings, which in accordance with the invention are fixed to the barrel, will prevent rotation of the molten material with the screw so that mixing action is promoted.

BRIEF DESCRIPTION OF THE DRAWING

FIG. 1 is a longitudinal sectional view illustrating a single-screw extruder, which in a first embodiment, shown in the upper half of the drawing comprises a barrel composed of discrete annular elements and in a second embodiment, shown in the lower half of the drawing, consists of mixing rings, which are axially fixed by spacing rings.

FIG. 2 is a radial transverse sectional view taken on line II—II in FIG. 1 and showing the single-screw extruder.

FIG. 3 shows in a fragmentary axial sectional view the upper portion of a single-screw extruder in which the mixing rings are provided in alternation with passages which are inclined in opposite senses.

FIG. 4 illustrates a single-screw extruder in a fragmentary radial sectional view taken on line IV—IV in FIG. 3.

DETAILED DESCRIPTION OF THE PREFERRED EMBODIMENTS

Illustrative embodiments of the invention will now be described in more detail with reference to the drawing.

In the embodiment shown in the lower part of FIG. 1, a feed screw 2 provided with helical lands 7 is rotatably mounted in the integral feed barrel 1 having the overall length F. The heating and/or cooling elements 3 and the supports 4, which carry the feed barrel 1, are only schematically indicated. The integral feed barrel 1 is connected to another integral barrel 5, which defines the mixing zone having the length M. The two barrels are interconnected by means of annular flanges provided on the barrels, as shown. The barrel 5 which defines the mixing zone is also temperature-controlled by means of heating and/or cooling elements 3. The flanges of the barrels are interconnected by screws, which are indicated by phantom lines.

The bore of the integral barrel 5, which defines the mixing zone, contains inserted split carrying rings, each of which consists of two halves 9', 9" (see FIG. 2) and which are provided with radially inwardly protruding mixing pins 10, which extend into recesses 8 formed in the helical land 7 of the rotating screw. By means of hardened spacing rings 17 the carrying rings 9', 9" are spaced the required distance apart.

A rotation of the split carrying rings 9', 9" and of the retaining spacing rings 17 in unison with the screw is prevented by axially parallel keys 12, which are suitably received in axially parallel grooves formed in the interfaces 11 of the mixing rings.

Because the mixing pins 10 are relatively small in diameter, the recesses 8 in the helical lands 7 may have a correspondingly short axial length L.

In the embodiment shown in the upper portion of FIG. 1 the feed barrel is a composite structure and is preferably composed of coextensive annular cylindrical sections 1', each at which has a length Fn, Fn-1. The inner edge portions of the interfaces extending in radial planes 18 are stepped to define inner annular grooves in which carrying rings 9 provided with mixing pins 10 can be received and clamped in position.

Similarly, the barrel defining the mixing zone is also composed of discrete flangelike carrying rings 5', 5", which have an overall length Mx. The rings 5', 5" are held together by connecting screws 6" and are temperature-controlled by heating or cooling elements 3'.

In another embodiment, shown in FIGS. 3 and 4, the zone M for mixing the molten material contains inserted stationary bisected mixing rings 13, each of which consists of two parts 13', 13" which have axially parallel interfaces and are formed with flow passages 15', 15", which serve to conduct the molten material and are inclined in mutually opposite inclinations, relative to the axis of feed screw 2, and in alternation.

In the embodiment shown in FIGS. 3 and 4, the revolving groovelike recesses 8' in the helical land 7 of the screw have a larger width L' so that the recesses have a larger area for receiving the mixing rings 13. In the deeper grooves, the mixing rings 13 extend into the barrel to a larger depth. The inside surface of the barrel and the diameter of the feed screw 2 are formed with substantially conical transition surfaces 16, which promote the feeding of the molten material toward and into the crossing flow passages 15', 15".

I claim:

1. A single-screw extruder for producing thermoplastic and elastomeric products, comprising a hollow cylindrical barrel, which is provided with inwardly protruding mixing elements, and a screw, which is rotatably disposed in the barrel and has a core and at least one helical land on the core said at least one helical land formed with recesses with the mixing elements extending into the helical land recesses, wherein the mixing elements are carried by split carrying rings, which are axially spaced apart by interposed spacing rings, the split carrying rings having on their outside surfaces on both sides of their interfaces axially extending step-shaped recesses which are mirror images of each other, the barrel having a longitudinal recess, and wherein the carrying ring recesses and the barrel recess define grooves for key means which extend into the grooves to non-rotatably support the carrying rings in the barrel when the extruder is assembled.

2. A single-screw extruder according to claim 1, wherein the spacing rings are non-rotatably connected to the housing.

3. A single-screw extruder according to claim 2, wherein axial recesses are provided in said spacing rings the spacing ring recesses and the barrel recess define a portion of said grooves and said key means extend in said grooves to non-rotatably connect said spacing rings to the barrel.

4. A single-screw extruder according to claim 1, wherein the carrying rings are split in an axial center plane.

5. A single-screw extruder according to claim 1, wherein the carrying rings radially carry said inwardly protruding mixing elements, said mixing elements being cylindrical pins.

6. A single-screw extruder according to claim 1, wherein the mixing elements include passages which are inclined in mutually opposite inclinations relative to the axis of the screw, in alternation, and said passages have inlets and outlets respectively disposed adjacent to the inside surface of the barrel and adjacent to the core of the screw.

7. A single-screw extruder for producing thermoplastic and elastomeric products, comprising a hollow cylindrical barrel, which is provided with inwardly protruding mixing elements, and a screw, which is rotatably disposed in the barrel and has a core and at least one helical land on the core said at least one helical land formed with recesses with the mixing elements extending into the helical land recesses, wherein the barrel includes a plurality of annular barrel sections having annular recessed inner edge portions, which when said sections are forced against each other constitute the side faces of annular grooves, and the mixing elements include split mixing rings, which are clamped in said annular grooves, and the split mixing rings having on their outside surfaces on both sides of their interfaces with axially extending step-shaped recesses which are mirror images of each other, wherein the barrel sections include longitudinal recess means, and wherein in the assembled extruder the mixing ring recesses and the barrel longitudinal recess means define grooves for key means which extend into the grooves to non-rotatably support the mixing rings in the barrel.

8. A single-screw extruder according to claim 7, wherein the mixing rings are split in an axial center plane.

9. A single-screw extruder according to claim 7, wherein the mixing rings radially carry said inwardly protruding mixing elements, said mixing elements being cylindrical pins.

10. A single-screw extruder according to claim 4, wherein the mixing elements include passages which are inclined in mutually opposite inclinations relative to the axis of the screw, in alternation, and said passages have inlets and outlets respectively disposed adjacent to the inside surface of the barrel and adjacent to the core of the screw.

11. A single-screw extruder for producing thermoplastic and elastomeric products, comprising a hollow cylindrical barrel, which is provided with inwardly protruding mixing elements, and a screw, which is rotatably disposed in the barrel and has a core and at least one helical land on the core said at least one helical land formed with recesses with the mixing elements extending into the helical land recesses, wherein the mixing elements include split mixing rings which are formed with passages which are inclined in mutually opposite inclinations relative to the axis of the screw, in alternation, and the passages have inlets and outlets respectively disposed adjacent to the inside surface of the barrel and adjacent to the core of the screw, and the split mixing rings having on their outside surfaces on both sides of their interfaces with axially extending step-shaped recesses which are mirror images of each other, wherein the barrel includes longitudinal recess means, and wherein in the assembled extruder the mixing ring recesses and the barrel recess means define grooves for key means which extend into the grooves to non-rotatably support the mixing rings in the barrel.

* * * * *